| United States Patent [19] | [11] Patent Number: 4,908,122 |
|---|---|
| Frame et al. | [45] Date of Patent: Mar. 13, 1990 |

[54] PROCESS FOR SWEETENING A SOUR HYDROCARBON FRACTION

[75] Inventors: Robert R. Frame, Glenview; Jeffery C. Bricker, Buffalo Grove, both of Ill.

[73] Assignee: UOP, Des Plaines, Ill.

[21] Appl. No.: 349,013

[22] Filed: May 8, 1989

[51] Int. Cl.$^4$ .................. C10G 27/10; C10G 29/00
[52] U.S. Cl. ............................. 208/207; 208/189; 208/203; 208/206; 502/163; 502/164; 502/167
[58] Field of Search ............... 208/189, 207; 502/163, 502/164, 167

[56] References Cited

U.S. PATENT DOCUMENTS

| 2,289,924 | 7/1942 | Morrell et al. | 208/207 |
|---|---|---|---|
| 2,915,460 | 12/1959 | Mills et al. | 208/189 |
| 2,918,426 | 12/1959 | Quiquerez et al. | 208/206 |
| 2,966,453 | 12/1960 | Gleim et al. | 208/206 |
| 2,988,500 | 6/1961 | Gleim et al. | 208/206 |
| 3,108,081 | 10/1963 | Gleim et al. | 252/428 |
| 3,252,892 | 5/1966 | Gleim | 208/206 |
| 3,392,111 | 7/1968 | Napier et al. | 208/189 |
| 3,980,582 | 9/1976 | Anderson et al. | 252/428 |
| 4,124,494 | 11/1978 | Frame | 208/207 |
| 4,156,641 | 5/1979 | Frame | 208/207 |
| 4,157,312 | 6/1979 | Frame | 208/207 |
| 4,203,827 | 5/1980 | Frame | 208/206 |
| 4,207,173 | 6/1980 | Stansky | 28/207 |
| 4,248,694 | 2/1981 | Carlson et al. | 208/207 |
| 4,260,474 | 4/1981 | Frame | 208/207 |
| 4,290,913 | 9/1981 | Frame | 252/428 |
| 4,298,463 | 11/1981 | Frame | 208/189 |
| 4,337,147 | 6/1982 | Frame | 208/206 |
| 4,360,421 | 11/1982 | Frame | 208/207 |
| 4,490,246 | 12/1984 | Verachtert | 208/206 |
| 4,498,978 | 2/1985 | Frame | 208/189 |
| 4,502,949 | 3/1985 | Frame et al. | 208/207 |
| 4,672,047 | 6/1987 | Chandler | 208/189 |
| 4,753,722 | 6/1988 | Le et al. | 208/207 |
| 4,824,818 | 4/1989 | Bricker et al. | 208/189 |

*Primary Examiner*—Helane Myers
*Attorney, Agent, or Firm*—Thomas K. McBride; Eugene I. Snyder; Frank S. Molinaro

[57] ABSTRACT

The present invention deals with a process for sweetening a sour hydrocarbon fraction containing mercaptans. The process involves contacting the hydrocarbon fraction in the presence of an oxidizing agent with a catalytic composite, ammonium hydroxide and a quaternary ammonium salt other than hydroxide. The instant process does not use any strong base nor any alkali hydroxides to sweeten the sour hydrocarbon fraction.

9 Claims, No Drawings

PROCESS FOR SWEETENING A SOUR HYDROCARBON FRACTION

BACKGROUND OF THE INVENTION

Processes for the treatment of a sour hydrocarbon fraction where the fraction is treated by contacting it with an oxidation catalyst and an alkaline agent in the presence of an oxidizing agent at reaction conditions have become well known and widely practiced in the petroleum refining industry. These processes are typically designed to effect the oxidation of offensive mercaptans contained in a sour hydrocarbon fraction to innocuous disulfides—a process commonly referred to as sweetening. The oxidizing agent is most often air. Gasoline, including natural, straight run and cracked gasolines, is the most frequently treated sour hydrocarbon fraction. Other sour hydrocarbon fractions which can be treated include the normally gaseous petroleum fraction as well as naphtha, kerosene, jet fuel, fuel oil, and the like.

A commonly used continuous process for treating sour hydrocarbon fractions entails contacting the fraction with a metal phthalocyanine catalyst dispersed in an aqueous caustic solution to yield a doctor sweet product. The sour fraction and the catalyst containing aqueous caustic solution provide a liquid-liquid system wherein mercaptans are converted to disulfides at the interface of the immiscible solutions in the presence of an oxidizing agent—usually air. Sour hydrocarbon fractions containing more difficult to oxidize mercaptans are more effectively treated in contact with a metal chelate dispersed on a high surface area adsorptive support—usually a metal phthalocyanine on an activated charcoal. The fraction is treated by contacting it with the supported metal chelate catalyst at oxidation conditions in the presence of an alkaline agent. One such process is described in U.S. Pat. No. 2,988,500. The oxidizing agent is most often air admixed with the fraction to be treated, and the alkaline agent is most often an aqueous caustic solution charged continuously to the process or intermittently as required to maintain the catalyst in the caustic-wetted state.

The prior art shows that the usual practice of catalytically treating a sour hydrocarbon fraction containing mercaptans involves the introduction of alkaline agents, usually sodium hydroxide, into the sour hydrocarbon fraction prior to or during the treating operation. See U.S. Pat. Nos. 3,108,081 and 4,156,641. The prior art also discloses that quaternary ammonium compounds can improve the activity of these catalytic systems. For example, see U.S. Pat. Nos. 4,290,913 and 4,337,147. In these patents the catalytic composite comprises a metal chelate, an alkali metal hydroxide and a quaternary ammonium hydroxide dispersed on an adsorptive support.

Although the above process has shown commercial success, there are problems associated with the use of alkaline agents. One problem is that phenols and cresols present in the hydrocarbon stream are extracted into the aqueous alkaline solution. Since phenol is on the EPA list of hazardous compounds, the solution containing the phenols is considered a hazardous waste and must be disposed of according to EPA procedures. Also because of the presence of alkali metals, the aqueous waste stream cannot be used in other parts of the refinery owing to possible contamination of vessels or catalysts with the alkali metals.

Applicants have solved the above problems by making the discovery that ammonium hydroxide can be effectively substituted for an alkali metal hydroxide and that a quaternary ammonium salt (where the anion is halide, nitrate, nitrite, sulfate, phosphate, acetate, citrate and tartrate) can be substituted for a quaternary ammonium hydroxide. Thus, applicants' process does not use any strong base. By using ammonium hydroxide no alkali metals are present in the aqueous waste stream, thereby allowing the waste stream to be re-used in other parts of the refinery. If direct disposal is necessary, this stream can be handled more easily than a corresponding alkali metal hydroxide solution because of the low level of dissolved phenols and the ease by which some or all of the ammonium hydroxide may be stripped from the waste stream.

The only prior art reference known to applicants which mentions the use of ammonia is U.S. Pat. No. 4,502,949. This patent discloses a process for sweetening a sour hydrocarbon fraction using a metal chelate catalyst and anhydrous ammonia in the absence of an aqueous phase. There are several differences between the present invention and the '949 reference. First, the '949 specifically states that the ammonia is present in an anhydrous form and is used in the absence of an aqueous phase. In contrast to this, applicants use ammonium hydroxide in an aqueous form. There is no indication in the '949 reference that aqueous ammonium hydroxide would be a good promoter for mercaptan sweetening.

Second, the stability of the catalyst when ammonia is used is only about 60 hours. Although the '949 reference states that this stability is improved versus a process without ammonia, the stability is very poor when compared to a conventional process using an alkali metal hydroxide. In contrast, applicants' data show that the stability of the catalyst in the instant process is several hundred hours (see details infra), i.e., comparable to a conventional process.

The stability and efficiency of a process using ammonium hydroxide and a quaternary ammonium salt other than hydroxide salt is also unexpected based on the knowledge that alkali metal hydroxides successfully promote mercaptan sweetening. The reason for this is that ammonium hydroxide and alkali metal hydroxides have vastly different base properties. Whereas ammonium hydroxide is a weak base with a $K_b$ (dissociation constant) of $1.79 \times 10^{-5}$, alkali metal hydroxides are strong bases which are 100% dissociated, $K_b \approx 1$. Since the first step in the oxidation of mercaptans is to form a mercaptide ion by abstracting a proton using a strong base, it would not be expected that a weak base such as ammonium hydroxide would adequately promote mercaptan sweetening.

The inadequacy of using ammonium hydroxide is shown by U.S. Pat. No. 4,207,173. The object of the '173 patent is the use of a tetra-alkyl guanidine as a promoter for mercaptan oxidation (no alkaline base present). However, in Table 1, column 8, there is presented data comparing sodium and ammonium hydroxide. The data clearly show that using ammonium hydroxide would not provide an acceptable, i.e., sweet, product. Thus, based on the prior art there is no incentive to substitute ammonium hydroxide for sodium hydroxide.

Of additional importance is the fact that the instant process uses a quaternary ammonium salt other than the hydroxide salt. These salts are not strong bases. The instant process, therefore, sweetens sour hydrocarbon fractions without the use of any strong base. Although the '173 reference uses only a tetraalkyl guanidine as a promoter, there is no indication that such a system would have long term stability. In contrast, applicants have shown (see data infra) that use of ammonium hydroxide and a quaternary ammonium salt affords a process which exhibits very little catalyst deterioration.

SUMMARY OF THE INVENTION

It is a broad objective of this invention to present an improved process for treating a sour hydrocarbon fraction containing mercaptans. Thus, one broad embodiment of the invention is a process for sweetening a sour hydrocarbon fraction containing mercaptans comprising contacting the hydrocarbon fraction in the presence of an oxidizing agent with a catalytic composite effective in oxidizing said mercaptans to disulfides, ammonium hydroxide and a quaternary ammonium salt having the structural formula

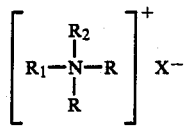

where R is a hydrocarbon group containing up to about 20 carbon atoms and selected from the group consisting of alkyl, cycloalkyl, aryl, alkaryl, and aralkyl; $R_1$ is a straight chain alkyl group containing from about 5 to about 20 carbon atoms; $R_2$ is a hydrocarbon group selected from the group consisting of aryl, alkaryl and aralkyl, and X is an anion selected from the group consisting of halide, nitrate, nitrite, sulfate, phosphate, acetate, citrate and tartrate, and said catalytic composite comprises a metal chelate dispersed on an adsorbent support.

Other objects and embodiments of this invention will become apparent in the following detailed description.

DETAILED DESCRIPTION OF THE INVENTION

As stated, the process of this invention comprises contacting a sour hydrocarbon fraction in the presence of an oxidizing agent with a catalytic composite, ammonium hydroxide and a quaternary ammonium salt. The catalytic composite comprises a metal chelate dispersed on an adsorbent support. The adsorbent support which may be used in the practice of this invention can be any of the well known adsorbent materials generally utilized as a catalyst support or carrier material. Preferred adsorbent materials include the various charcoals produced by the destructive distillation of wood, peat, lignite, nutshells, bones, and other carbonaceous matter, and preferably such charcoals as have been heat-treated or chemically treated or both, to form a highly porous particle structure of increased adsorbent capacity, and generally defined as activated carbon or charcoal. Said adsorbent materials also include the naturally occurring clays and silicates, e.g., diatomaceous earth, fuller's earth, kieselguhr, attapulgus clay, feldspar, montorillonite, halloysite, kaolin, and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. For example, in the treatment of a sour petroleum distillate, the adsorbent support should be insoluble in, and otherwise inert to, the hydrocarbon fraction at the alkaline reaction conditions existing in the treating zone. Charcoal, and particularly activated charcoal, is preferred because of its capacity for metal chelates, and because of its stability under treating conditions.

Another necessary component of the catalytic composite used in this invention is a metal chelate which is dispersed on an adsorptive support. The metal chelate employed in the practice of this invention can be any of the various metal chelates known to the art as effective in catalyzing the oxidation of mercaptans contained in a sour petroleum distillate, to disulfides or polysulfides. The metal chelates include the metal compounds of tetrapyridinoporphyrazine described in U.S. Pat. No. 3,980,582, e.g., cobalt tetrapyridinoporphyrazine; porphyrin and metaloporphyrin catalysts as described in U.S. Pat. No. 2,966,453, e.g., cobalt tetraphenylporphyrin sulfonate; corrinoid catalysts as described in U.S. Pat. No. 3,252,892, e.g., cobalt corrin sulfonate; chelate organometallic catalysts such as described in U.S. Pat. No. 2,918,426, e.g., the condensation product of an aminophenol and a metal of Group VIII; the metal phthalocyanines as described in U.S. Pat. No. 4,290,913, etc. As stated in U.S. Pat. No. 4,290,913, metal phthalocyanines are a preferred class of metal chelates.

The metal phthalocyanines which can be employed to catalyze the oxidation of mercaptans generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, platinum phthalocyanine, palladium phthalocyanine, copper phthalocyanine, silver phthalocyanine, zinc phthalocyanine, tin phthalocyanine, and the like. Cobalt phthalocyanine and vanadium phthalocyanine are particularly preferred. The ring substituted metal phthalocyanines are generally employed in preference to the unsubstituted metal phthalocyanine (see U.S. Pat. No. 4,290,913), with the sulfonated metal phthalocyanine being especially preferred, e.g., cobalt phthalocyanine monosulfate, cobalt phthalocyanine disulfonate, etc. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

An optional component of the catalytic composite useful for this invention is an onium compound dispersed on the adsorptive support. Onium compounds are ionic compounds in which the positively charged (cationic) atom is a nonmetallic element other than carbon not bonded to hydrogen. The onium compounds which can be used in this invention are selected from the group consisting of phosphonium, ammonium, arsonium, stibonium, oxonium and sulfonium compounds, i.e., the cationic atom is phosphorus, nitrogen, arsenic, antimony, oxygen and sulfur, respectively. Table 1 presents the general formula of these onium compounds, and the cationic element.

TABLE 1

| Name and Formula of Onium Compounds | | |
|---|---|---|
| Formula* | Name | Cationic Element |
| $R_4N^+$ | quaternary ammonium | nitrogen |
| $R_4P^+$ | phosphonium | phosphorous |
| $R_4As^+$ | arsonium | arsenic |
| $R_4Sb^+$ | stibonium | antimony |
| $R_3O^+$ | oxonium | oxygen |
| $R_3S^+$ | sulfonium | sulfur |

*R is a hydrocarbon radical.

For the practice of this invention it is desirable that the onium compounds have the general formula $[R'(R)_yM]^+X^-$. In said formula, R is a hydrocarbon group containing up to about 20 carbon atoms and selected from the group consisting of alkyl, cycloalkyl, aryl, alkaryl and aralkyl, it is preferred that one R group be an alkyl group containing from about 10 to about 18 carbon atoms. The other R group(s) is (are) preferably methyl, ethyl, propyl, butyl, benzyl, phenyl and naphthyl groups. R' is a straight chain alkyl group containing from about 5 to about 20 carbon atoms and preferably an alkyl group containing about 10 to about 18 carbon atoms, X is hydroxide or a halide selected from the group consisting of chlorine, bromine or iodine, and y is 2 when M is oxygen or sulfur and y is 3 when M is phosphorous, nitrogen, arsenic or antimony. The preferred cationic elements are phosphorous, nitrogen, sulfur and oxygen, with nitrogen being especially preferred, and the preferred anions are chlorine and hydroxide.

Illustrative examples of onium compounds which can be used to practice this invention, but which are not intended to limit the scope of this invention are: benzyldiethyldodecylphosphonium chloride, phenyldimethyldecylphosphonium chloride, benzyldibutyldecylphosphonium chloride, benzyldimethylhexadecylphosphonium chloride, trimethyldodecylphosphonium chloride, naphthyldimethylhexadecylphosphonium chloride, tributylhexadecylphosphonium chloride, benzylmethylhexadecyloxonium chloride, benzylethyldodecyloxonium chloride, naphthylpropyldecyloxonium chloride, dibutyldodecyloxonium chloride, phenylmethyldodecyloxonium chloride, dipropylhexadecyloxonium chloride, dibutylhexadecyloxonium chloride, benzylmethylhexadecylsulfonium chloride, diethyldodecylsulfonium chloride, naphthylpropylhexadecylsulfonium chloride, phenylmethylhexadecylsulfonium chloride, dimethylhexadecylsulfonium chloride, benzylbutyldodecylsulfonium chloride, benzyldiethyldodecylarsonium chloride, benzyldiethyldodecylstibonium chloride, trimethyldodecylarsonium chloride, trimethyldodecylstibonium chloride, benzyldibutyldecylarsonium chloride, benzyldibutyldecylstibonium chloride, tributylhexadecylarsonium chloride, tributylhexadecylstibonium chloride, naphthylpropyldecylarsonium chloride, naphthylpropyldecylstibonium chloride, benzylmethylhexadecylarsonium chloride, benzylmethylhexadecylstibonium chloride, benzylbutyldodecylarsonium chloride, benzylbutyldodecylstibonium chloride, benzyldimethyldodecylammonium chloride, benzyldimethyltetradecylammonium chloride, benzyldimethylhexadecylammonium chloride, benzyldimethyloctadecylammonium chloride, dimethylcyclohexyloctylammonium chloride, diethylcyclohexyloctylammonium chloride, dipropylcyclohexyloctylammonium chloride, dimethylcyclohexyldecylammonium chloride, diethylcyclohexyldecylammonium chloride, dipropylcyclohexyldecylammonium chloride, dimethylcyclohexyldodecylammonium chloride, diethylcyclohexyldodecylammonium chloride, dipropylcyclohexyldodecylammonium chloride, dimethylcyclohexyltetradecylammonium chloride, diethylcyclohexyltetradecylammonium chloride, dipropylcyclohexyltetradecylammonium chloride, dimethylcyclohexylhexadecylammonium chloride, diethylcyclohexylhexadecylammonium chloride, dipropylcyclohexylhexadecylammonium chloride, dimethylcyclohexyloctadecylammonium chloride, diethylcyclohexyloctadecylammonium chloride, dipropylcyclohexyloctadecylammonium chloride, and the like. Other suitable quaternary ammonium chlorides are described in U.S. Pat. No. 4,203,827. The corresponding bromides, iodides and hydroxides may also be used.

The metal chelate component and optional onium compound can be dispersed on the adsorbent support in any conventional or otherwise convenient manner. The components can be dispersed on the support simultaneously from a common aqueous or alcoholic solution and/or dispersion thereof or separately and in any desired sequence. The dispersion process can be effected utilizing conventional techniques whereby the support in the form of spheres, pills, pellets, granules or other particles of uniform or irregular size or shape, is soaked, suspended, dipped one or more times, or otherwise immersed in an aqueous or alcoholic solution and/or dispersion to disperse a given quantity of the alkali metal hydroxide, onium compound and metal chelate components. Typically, the onium compound will be present in a concentration of about 0.1 to about 10 weight percent of the composite. In general, the amount of metal phthalocyanine which can be adsorbed on the solid adsorbent support and still form a stable catalytic composite is up to about 25 weight percent of the composite. A lesser amount in the range of from about 0.1 to about 10 weight percent of the composite generally forms a suitably active catalytic composite.

One preferred method of preparation involves the use of a steam-jacketed rotary dryer. The adsorbent support is immersed in the impregnating solution and/or dispersion containing the desired components contained in the dryer and the support is tumbled therein by the rotating motion of the dryer. Evaporation of the solution in contact with the tumbling support is expedited by applying steam to the dryer jacket. In any case, the resulting composite is allowed to dry under ambient temperature conditions, or dried at an elevated temperature in an oven, or in a flow of hot gases, or in any other suitable manner.

An alternative and convenient method for dispersing the onium compound, metal chelate and optional onium compound on the solid adsorbent support comprises predisposing the support in a sour hydrocarbon fraction treating zone or chamber as a fixed bed and passing a metal chelate and optional onium compound solution and/or dispersion through the bed in order to form the catalytic composite in situ. This method allows the solution and/or dispersion to be recycled one or more times to achieve a desired concentration of the metal chelate and optional onium compound on the adsorbent support. In still another alternative method, the adsorbent may be predisposed in said treating zone or chamber, and the zone or chamber thereafter filled with the solution and/or dispersion to soak the support for a predetermined period.

Typically, the sour hydrocarbon fraction is contacted with the catalytic composite which is in the form of a fixed bed. The contacting is thus carried out in a continuous manner. An oxidizing agent such as oxygen or air, with air being preferred, is contacted with the fraction and the catalytic composite to provide at least the stoichiometric amount of oxygen required to oxidize the mercaptan content of the fraction to disulfides.

Another essential feature of the process of this invention is that the hydrocarbon fraction be contacted with an aqueous solution containing ammonium hydroxide and a quaternary ammonium salt. The amount of ammonium hydroxide which may be employed varies considerably but is conveniently chosen to be from about 0.1 to about 200 wppm based on hydrocarbon feed and preferably from about 1 to about 20 wppm. The quaternary ammonium salt has the structural formula

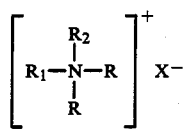

where R is a hydrocarbon group containing up to about 20 carbon atoms and selected from the group consisting of alkyl, cycloalkyl, aryl, alkaryl, and aralkyl; $R_1$ is a straight chain alkyl group containing from about 5 to about 20 carbon atoms; $R_2$ is a hydrocarbon group selected from the group consisting of aryl, alkaryl and aralkyl; and X is an anion selected from the group consisting of halide, nitrate, nitrite, sulfate, phosphate, acetate, citrate and tartrate. Illustrative examples of the quaternary ammonium chlorides which can be used are presented in the paragraphs dealing with onium compounds. The corresponding nitrate, nitrite, sulfate, phosphate, acetate, citrate and tartrate may also be used. The quaternary ammonium salt should be present in a concentration from about 0.05 to about 500 wppm based on the hydrocarbon feed, preferably from about 0.5 to about 100 wppm, and most preferably from about 1 to about 30 wppm. The aqueous solution may further contain a solubilizer to promote mercaptan solubility, e.g., alcohols and especially methanol, ethanol, n-propanol, isopropanol, etc. The solubilizer, when employed, is preferably methanol, and the aqueous solution may suitably contain from about 2 to about 10 volume percent thereof.

The treating conditions which may be used to carry out the present invention are those that have been disclosed in the prior art treating conditions. The process is usually effected at ambient temperature conditions, although higher temperatures up to about 105° C. are suitably employed. Pressures of up to about 1,000 psi or more are operable although atmospheric or substantially atmospheric pressure are suitable. Contact times equivalent to a liquid hourly space velocity of from about 0.5 to about 10 or more are effective to achieve a desired reduction in the mercaptan content of a sour petroleum distillate, an optimum contact time being dependent on the size of the treating zone, the quantity of catalyst contained therein, and the character of the fraction being treated.

As previously stated, sweetening of the sour hydrocarbon fraction is effected by oxidizing the mercaptans to disulfides. Accordingly, the process is effected in the presence of an oxidizing agent, preferably air, although oxygen or other oxygen-containing gases may be employed. In fixed bed treating operations, the sour hydrocarbon fraction may be passed upwardly or downwardly through the catalytic composite. The sour hydrocarbon fraction may contain sufficient entrained air, but generally added air is admixed with the frction and charged to the treating zone concurrently therewith. In some cases, it may be advantageous to charge the air separately to the treating zone and countercurrent to the fraction separately charged thereto. Examples of specific arrangements to carry out the treating process may be found in U.S. Pat. Nos. 4,490,246 and 4,753,722 which are incorporated by reference.

As stated, the improvement in the process of treating a sour hydrocarbon fraction of this invention is the replacement of ammonium hydroxide for an alkali metal hydroxide, e.g., sodium hydroxide. Applicants have unexpectedly discovered that ammonium hydroxide, which is a weak base, can effectively be substituted for strong bases such as sodium hydroxide. All indications from the prior art are that ammonium hydroxide would not be an effective substitute for an alkali metal hydroxide. Finally, applicants' invention solves an important environmental problem associated with alkali metal hydroxide—disposal of the waste stream.

The following examples are presented in illustration of this invention and are not intended as undue limitations on the generally broad scope of the invention as set out in the appended claims.

EXAMPLE 1

A sour FCC gasoline feedstock boiling in the 48°–228° C. range and containing about 85 wppm mercaptan sulfur was processed downflow through a catalytic composite at a liquid hourly space velocity of about 10 or 20, an inlet temperature of 38° C. and a pressure of 70 psig. The catalytic composite was present as a fixed bed in a tubular reactor and consisted of a sulfonated cobalt phthalocyanine on carbon. The catalytic composite was prepared by filling the reactor bed with activated carbon (obtained from Norit Co.) in the form of 10–20 mesh granules and then downflowing an aqueous ammoniacal solution of sulfonated cobalt phthalocyanine (the sulfonated cobalt phthalocyanine (CoPC) was obtained from GAF Co.) to give a concentration of 0.15 g CoPC per 100 cc of carbon support.

The feedstock was charged under sufficient air pressure to provide about 1.2 times the stoichiometric amount of oxygen required to oxidize the mercaptans. The quaternary ammonium chloride was obtained from Mason Chemical Co. and consisted of a mixture of benzyldimethylalkylammonium chloride and benzylmethyldialkylammonium chloride. The alkyl groups are nominally $C_{14}$ straight chain alkyl groups. An aqueous solution containing ammonium hydroxide, present in a concentration of 2 weight percent expressed as $NH_3$ and 1 weight percent quaternary ammonium hydroxide was added at such a rate to give 10 wppm of $NH_3$ and 5 wppm of the quaternary ammonium chloride. The results from this experiment are presented in Table 2.

TABLE 2

| Promotion of Mercaptan Oxidation by NH₄OH* and Quaternary Ammonium Chloride* | | |
|---|---|---|
| Time on Stream (Hrs) | Product Mercaptan Sulfur (WPPM) | LHSV |
| 50 | 4 | 10 |
| 100 | 3 | 10 |
| 150 | 2 | 10 |

TABLE 2-continued

| Promotion of Mercaptan Oxidation by NH$_4$OH* and Quaternary Ammonium Chloride* | | |
|---|---|---|
| Time on Stream (Hrs) | Product Mercaptan Sulfur (WPPM) | LHSV |
| 200 | 2 | 10 |
| 250 | 2 | 10 |
| 300 | 4 | 20 |
| 350 | 5 | 20 |
| 400 | 5 | 20 |

*NH$_4$OH concentration = 10 WPPM expressed as NH$_3$
Quaternary Ammonium Chloride = 5 WPPM The data presented in Table 2 clearly show the promotion effect of ammonium hydroxide and a quaternary ammonium chloride. The data also show the stability of the cobalt phthalocyanine catalyst over 400 hours of on stream operation.

We claim as our invention:

1. A process for sweetening a sour hydrocarbon fraction containing mercaptans comprising contacting the hydrocarbon fraction in the presence of an oxidizing agent with a catalytic composite effective in oxidizing said mercaptans to disulfides, ammonium hydroxide and a quaternary ammonium salt having the structural formula

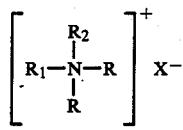

where R is a hydrocarbon group containing up to about 20 carbon atoms and selected from the group consisting of alkyl, cycloalkyl, aryl, alkaryl, and aralkyl, $R_1$ is a straight chain alkyl group containing from about 5 to about 20 carbon atoms, $R_2$ is a hydrocarbon group selected from the group consisting of aryl, alkaryl and aralkyl, X is an anion selected from the group consisting of halide, nitrate, nitrite, sulfate, phosphate, acetate, citrate and tartrate, and said catalytic composite comprising a metal chelate dispersed on an adsorbent support.

2. The process of claim 1 where the ammonium hydroxide is present in a concentration from about 0.1 to about 200 wppm based on hydrocarbons.

3. The process of claim 1 where the sour hydrocarbon fraction is gasoline.

4. The process of claim 1 where the metal chelate is a metal phthalocyanine.

5. The process of claim 4 where the metal phthalocyanine is cobalt phthalocyanine.

6. The process of claim 1 where the quaternary ammonium salt is a halide salt and is present in an amount from about 0.05 to about 500 wppm.

7. The process of claim 6 where the halide salt is a chloride salt.

8. The process of claim 1 further characterized in that the catalytic composite also contains an onium compound having the formula $[R'(R)yM]^+X^-$ where R is a hydrocarbon group containing up to about 20 carbon atoms and selected from the group consisting of alkyl, cycloalkyl, aryl, alkaryl and aralkyl, R' is a straight chain alkyl group containing from about 5 to about 20 carbon atoms, M is phosphorous (phosphonium compound), nitrogen (ammonium compound), arsenic (arsonium compound), antimony (stibonium compound), oxygen (oxonium compound) or sulfur (sulfonium compound), X is hydroxide, y is 2 when M is oxygen or sulfur and y is 3 when M is phosphorous, nitrogen, arsenic or antimony.

9. The process of claim 8 where the onium compound is an ammonium compound.

* * * * *